United States Patent [19]
Peck

[11] Patent Number: 5,388,684
[45] Date of Patent: Feb. 14, 1995

[54] PALLET CONVEYOR

[75] Inventor: Glenn Peck, Grand Blanc, Mich.

[73] Assignee: Peck Automated Systems, Inc., Grand Blanc, Mich.

[21] Appl. No.: 199,604

[22] Filed: Feb. 22, 1994

[51] Int. Cl.6 .............................................. B65G 25/00
[52] U.S. Cl. .................... 198/465.1; 198/465.3
[58] Field of Search .............. 198/465.1, 465.2, 465.3, 198/803.01; 104/236, 172.3, 165

[56] References Cited
U.S. PATENT DOCUMENTS

| | | | |
|---|---|---|---|
| 4,372,219 | 2/1983 | Gibbs | 104/165 |
| 4,442,935 | 4/1984 | Gregg | 198/465.3 |
| 5,012,917 | 5/1991 | Gilbert et al. | 198/465.1 X |
| 5,062,368 | 11/1991 | Sticht et al. | 198/465.1 X |
| 5,103,964 | 4/1992 | Sticht | 198/465.1 X |
| 5,178,261 | 1/1993 | Matheson et al. | 198/465.3 X |
| 5,213,195 | 5/1993 | Sticht | 198/465.2 |

*Primary Examiner*—James R. Bidwell
*Attorney, Agent, or Firm*—Gifford, Krass, Groh, Sprinkle, Patmore, Anderson & Citkowski

[57] ABSTRACT

A pallet conveyor has spaced pinion drives which engage racks mounted on the pallets to move the pallets along the conveyor.

1 Claim, 2 Drawing Sheets

PALLET CONVEYOR

BACKGROUND OF THE INVENTION

1. Field of the Invention

This invention relates to a conveyor system. More particularly, this invention relates to a conveyor in which pallets are conveyed along a fixed track or ways.

2. State of the Art

There is a wide variety of pallet conveyors available. Some of these conveyors use self-propelled pallets having a drive motor mounted on the pallet. Examples of this type of conveyor are shown in U.S. Pat. Nos. 4,307,922 and 4,987,834. In other pallet conveying systems, the drive or drives are located along the conveyor path such as the conveyor of U.S. Pat. No. 4,552,260.

SUMMARY OF THE INVENTION

The present invention pertains to a conveyor in which pallets carrying work pieces are non-synchronously driven along a track between work stations. Typically, the conveyor is of the accumulating type with position detectors located along the track. The conveyor includes at least one longitudinally extending pallet and a pair of transversely spaced parallel and longitudinally extending ways for supporting and guiding the pallet as it is being conveyed along the ways. Drives are longitudinally spaced along the ways for engaging and moving the pallets along the ways.

Preferably the drives are rotary motors with each including a driven pinion which engages a longitudinally extending rack on the pallet. The drive motors are spaced from each other a distance so that a downstream pinion engages the pallet before an upstream pinion disengages the pallet.

In a preferred form of the invention, the rack is spring loaded to the pallet so that as the pinion of a downstream rotary drive motor engages the rack while the pallet is being moved by an upstream pinion, the rack displaces relative to the pallet to accommodate the engagement.

The simple rack and pinion drive of the invention combined with location of state of the art position detectors along the conveyor path provides a new rapid delivery pallet conveyor system for precisely positioning heavy work pieces.

BRIEF DESCRIPTION OF THE DRAWING

The preferred embodiments of the invention are illustrated in the drawing in which.

DESCRIPTION OF THE PREFERRED EMBODIMENT

Figure 1:
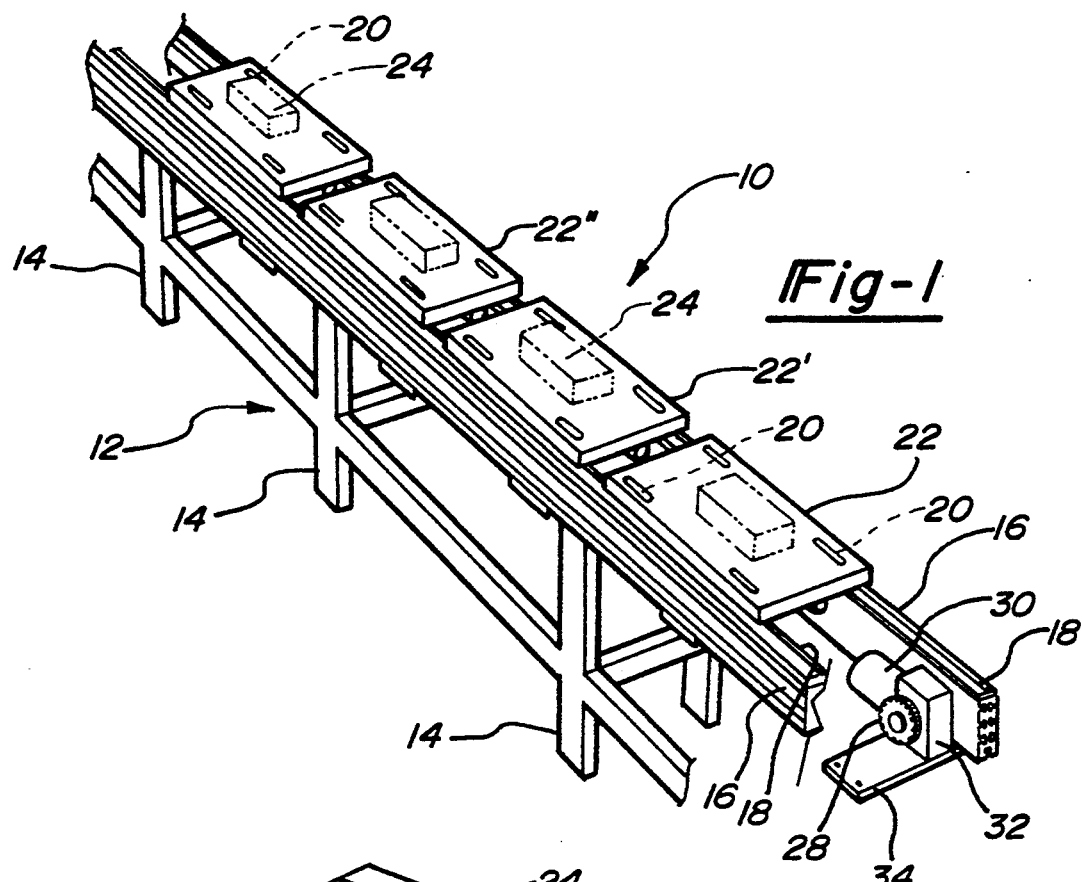
FIG. 1 is a perspective view with a portion broken away of the pallet conveyor of this invention.

Referring to FIG. 1, the pallet conveyor 10 of this invention is shown to include a longitudinally extending frame 12 with vertical supports 14 carrying a pair of transversely spaced extrusions 16.

Figure 2:
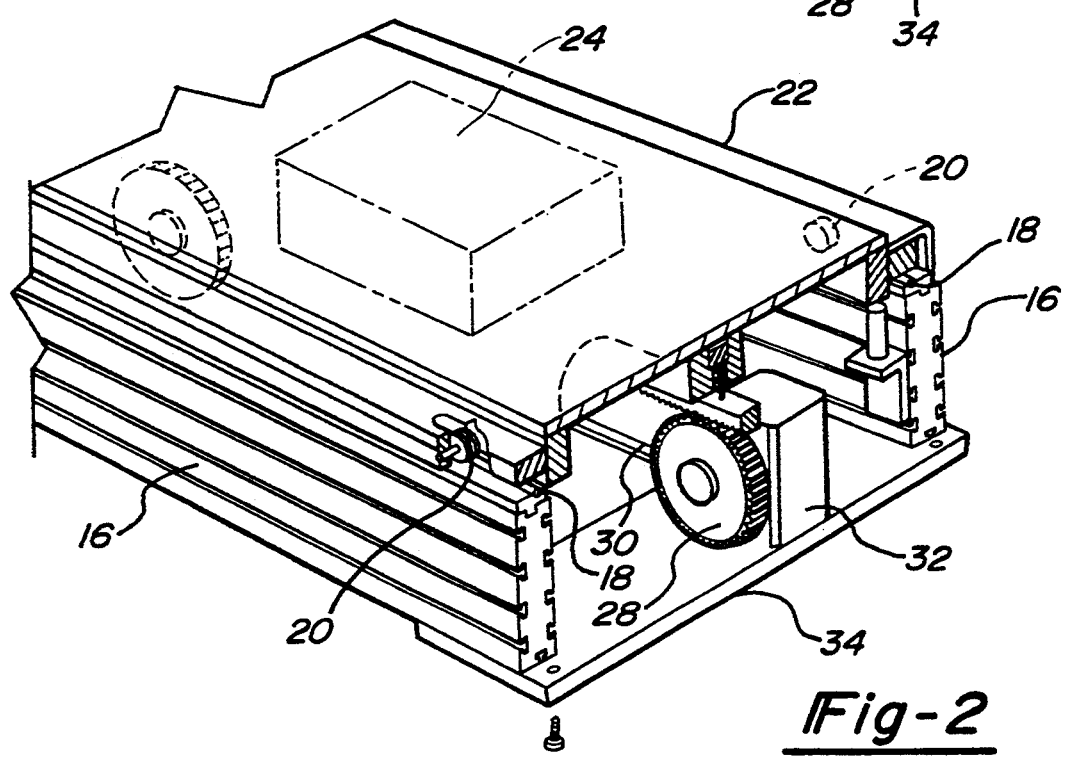
FIG. 2 is an enlarged perspective end view showing engagement of one of the pallets with one of the longitudinally spaced drive motors.
Figure 4:
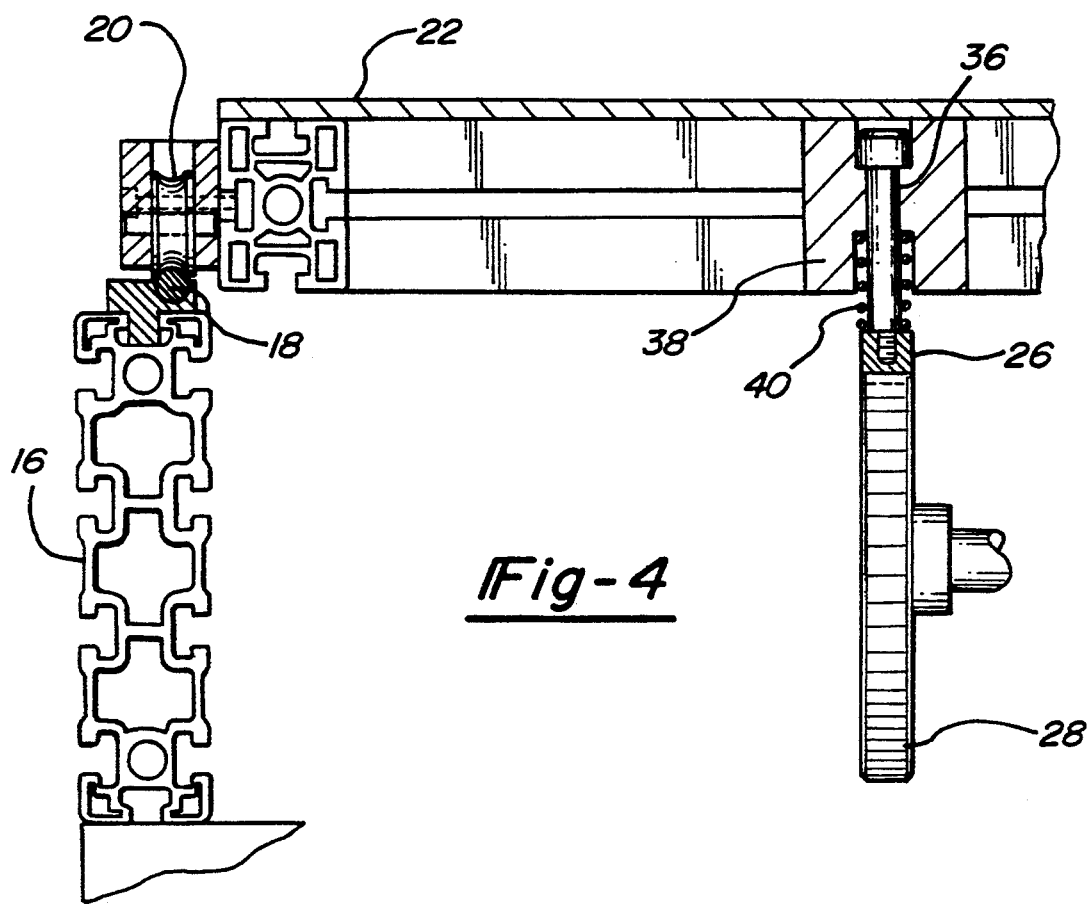
FIG. 4 is a partial cross sectional view showing engagement of a motor driven pinion with the spring loaded rack of a pallet.

Referring to FIGS. 2 and 4, the extrusions 16 carry at their tops ground cylindrical ways 18 upon which the precision wheels 20 of each pallet 22 glide. A precision wheel 20 is located at each corner of the pallet 22. The pallets 22 carry work pieces 24 between work stations which can be located along the length of the conveyor as is well known in the art.

Each pallet 22 carries a gear rack 26 which meshes with pinion gears 28 driven by spaced motors 30 through gear reducers 32 to move the pallet along the conveyor. As best seen in FIGS. 1 and 2, the motors 30 and their gear reducers 32 are conveniently carried by cross members 34 fastened to extrusions 16.

As seen in FIG. 4, the pallets 22 include an extruded body and are configured with a solid top. The pallets could have an open lattice frame and can be designed to meet the needs of each installation. The pallet bodies and extrusions 16 are preferably of aluminum.

In the preferred form of the invention, the rack 26 is spring loaded to the pallet 22 by spaced threaded studs 36 vertically slidable in recessed frame blocks 38 carrying springs 40 as best seen in FIG. 4. This allows vertical displacement of the rack 26 as a downstream pinion 28 engages the rack while the rack is still being driven by an upstream pinion 28'.

Figure 3:
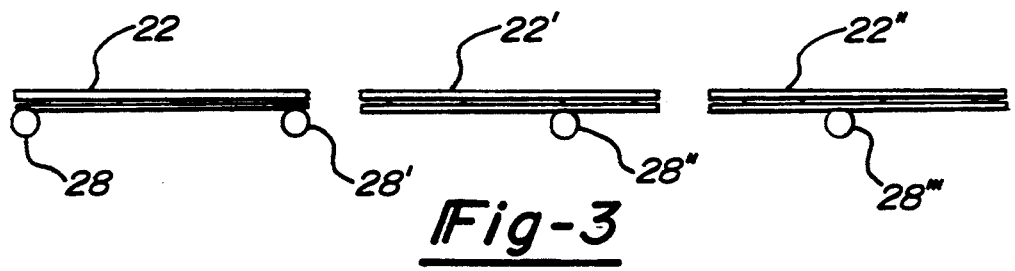
FIG. 3 is a schematic view of the pallets as they become successively engaged with the driven pinions of successive drive motors.

The motors 30 and gear reducers 32 and hence pinions 28 are evenly spaced along the conveyor as seen in FIG. 3. With this arrangement it is not necessary to synchronously drive the motors 30 or otherwise precisely locate the pinions 28. As seen in FIG. 3, the rack of pallet 22' will be engaged by the pinion 28' before being disengaged by the pinion 28'', and the rack of pallet 22'' will be engaged by the pinion 28'' before being disengaged by the pinion 28'''.

The use of commercially available extrusions 16 provide convenient movable mounting of limit or proximity switches and other accessories, not shown, to facilitate conveyor assembly and maintenance.

I claim:

1. A conveyor comprising, in combination:
   a longitudinally extending pallet;
   a pair of transversely spaced parallel and longitudinally extending ways for supporting said pallet as it is being conveyed along said ways;
   a plurality of rotary drive means longitudinally spaced along said ways for engaging and moving said pallet along said ways, each of said plurality of rotary drive means including a driven pinion which engages a longitudinally extending rack on said pallet;
   wherein said drive means are spaced from each other a distance so that a downstream drive means engages said pallet before an upstream drive means disengages said pallet; and
   wherein said rack is spring loaded to said pallet so that as the pinion of said downstream rotary drive means engages said rack while said pallet is being moved by said upstream rotary drive means, the rack can be displaced relative to said pallet to accommodate the engagement.

* * * * *